United States Patent [19]
Roth

[11] Patent Number: 6,116,002
[45] Date of Patent: Sep. 12, 2000

[54] BALER WITH IMPROVED GUIDE

[75] Inventor: Arsene Roth, Metz, France

[73] Assignee: Usines Claas France, Metz Woippy, France

[21] Appl. No.: 09/037,374

[22] Filed: Mar. 10, 1998

[30] Foreign Application Priority Data

Mar. 12, 1997 [DE] Germany .............. 197 10 076

[51] Int. Cl.⁷ .................................................. B65B 11/56
[52] U.S. Cl. ......................... 53/587; 53/118; 53/211; 100/5
[58] Field of Search ............ 53/587, 118, 211, 53/176; 100/5, 13

[56] References Cited

U.S. PATENT DOCUMENTS

| | | | |
|---|---|---|---|
| 4,580,398 | 4/1986 | Bruer et al. | 53/587 |
| 4,838,016 | 6/1989 | Frogbrook et al. | 100/5 |
| 5,129,208 | 7/1992 | Van Zee | 53/118 |
| 5,257,492 | 11/1993 | Watts | 53/118 |
| 5,349,806 | 9/1994 | Swearingen et al. | 100/5 |
| 5,450,704 | 9/1995 | Clostermeyer | 53/118 |
| 5,557,906 | 9/1996 | Viaud | 53/587 |

FOREIGN PATENT DOCUMENTS

| | | |
|---|---|---|
| 4308646A1 | 3/1993 | Germany . |
| 9421702U1 | 6/1996 | Germany . |

*Primary Examiner*—Mathew Luby
*Attorney, Agent, or Firm*—Husch & Eppenberger, LLC; Robert E. Muir; Sharon E. Payne

[57] ABSTRACT

A round baler has a guiding device for guiding baling material around the press- or idler rolls. The guiding device includes an elastic piece of material and a generally inelastic but form-flexible piece of material; so that on the one hand a high elasticity of the guiding device is achieved and on the other hand high endurance of the form-flexible material is achieved.

13 Claims, 2 Drawing Sheets

BALER WITH IMPROVED GUIDE

BACKGROUND OF THE INVENTION

The present invention relates generally to agricultural machinery and more particularly to a baler with a flexible device for guiding bailing materials.

The invention is advantageously embodied in a round baler. A typical round baler is described in German Patent No. 43 08 646 and has a main frame, chassis, pick-up and feeding device for harvested crop, drive apparatus, and a hinged pressing chamber which is defined on both sides by fixed walls and circumferentially at least partially by endless belts and/or rollers. The belts are entrained over radial bearing idlers. A device for guiding binding materials, consisting of flexible material, partially encloses at least one of the idlers. In operation, feeding of the harvested crop is interrupted after the pressed round bale is completed. At that time the pressed round bale, while continuously rotating, is wrapped by either twine, net, film or other suitable material which precludes a ripping apart of the bale after ejection from the round baler. The binding material passes at least be partially around a press- or idler pulley, before it is caught between the rotating crop bale and the belts. For the binding material to pass around a press- or idler pulley it has proven worthwhile to use a guiding device which allows the binding material to advance into the press- or idler pulley and to be pressed over a portion of the press- or idler pulley so that it is caught and pulled in by the press- or idler pulley. Usually such a guiding device consists of a steel sheet; however, a steel plate has the disadvantage that it cannot react flexibly enough to an out-of-balance press- or idler pulley, or to accumulation of the binding material. In this context the term "flexible" means that it can adapt itself passively to a given form, that it essentially reacts inelastically, and that it does not expand considerably in one particular direction. The steel sheet as a guiding device is neither flexible nor elastic. Even when sectional bars are installed in a spiral method on the surface of an idler pulley in order to clean the inside of the belts, or when circumferential profiling is provided on the respective surfaces for improved feeding by the press roll, a steel sheet guiding device and respective roll do not cooperate optimally to pull in the binding material. In these situations, a long distance must be provided between a guiding device made of sheet steel and the press roll or the belt than is desirable for a reliable pull-in operation.

In German Patent No. 43 08 646, the use of flexible material in the manufacture of the guiding means is generally proposed. However, tests have shown that said flexible material is not rugged enough to withstand the wear for long periods of time, especially in the loop area of the idler pulley or, more particularly, the press roll. These tests also have shown that the skid reducing effect of the elastic material surface can interfere with a reliable pull-in operation of the binding material.

An object of the present invention is to provide an improved guide for bailing materials which overcomes the disadvantages discussed above.

Another object is to arrange a guiding means for binding materials in a way that it is elastic on the one hand, while on the other hand shows a high degree of stability.

SUMMARY OF THE INVENTION

The objects are met by using a flexible guiding means connected to at least one piece of material which shows a longitudinal elasticity in at least the lengthwise direction of the guiding means, as well as at least one additional flexible piece of material.

In accordance with the invention there is provided a baler having a baling chamber, means for delivering harvested crop to the baling chamber, means for holding a supply of baling material, means for feeding the baling material toward the baling chamber, and means for guiding the baling material to the baling chamber. The guiding means comprises at least one piece of material which has elasticity in at least the lengthwise direction of the guiding means, and at least one additional form-flexible piece of material.

Additional preferred arrangements of the invention are described in the dependent claims.

BRIEF DESCRIPTION OF THE DRAWINGS

Reference is now made to the drawings which illustrate a preferred embodiment of the invention and wherein the same numerals indicate the same parts throughout the figures.

DETAILED DESCRIPTION

Figure 1:
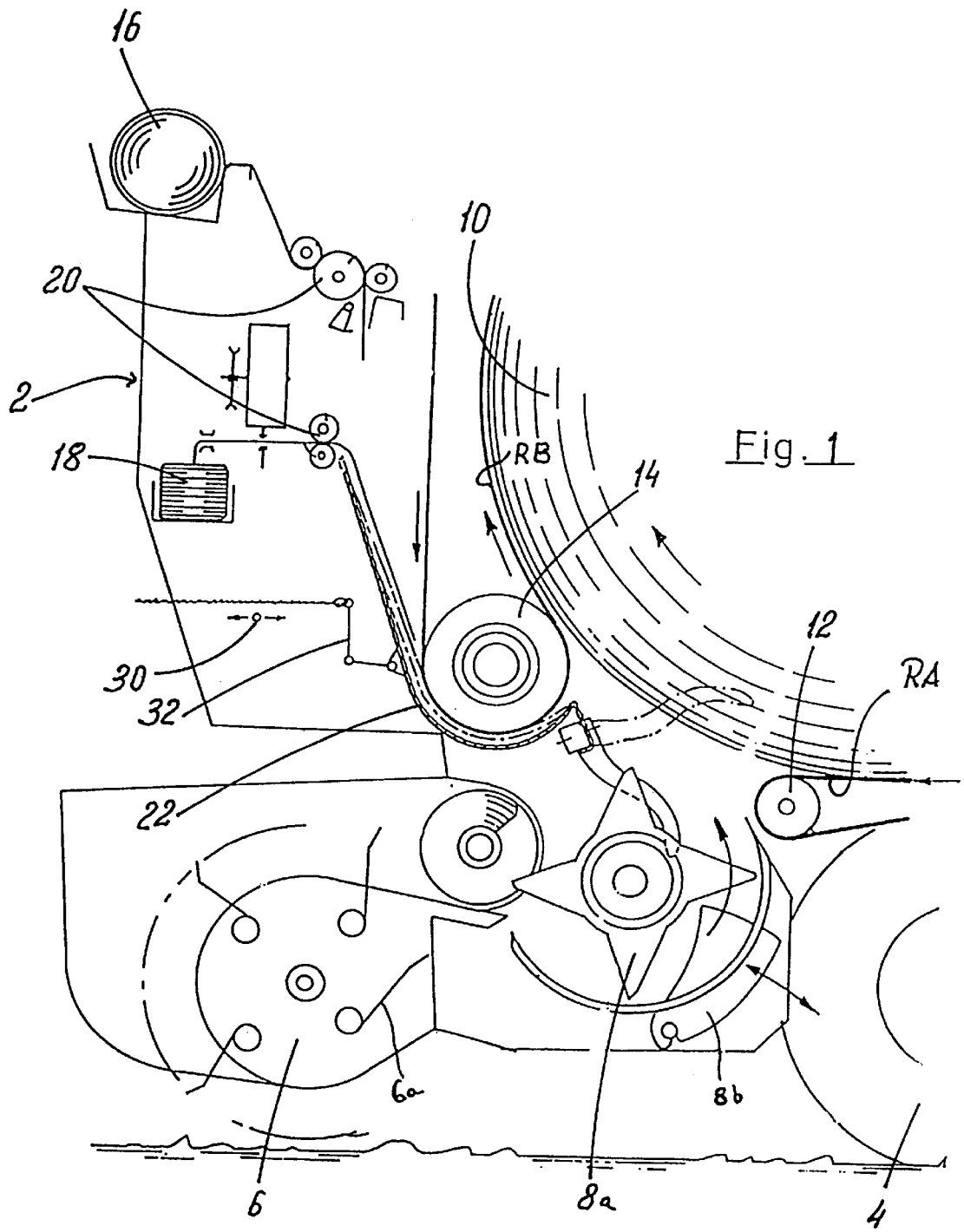
FIG. 1 is a schematic side view of a round baler utilizing an embodiment of the present invention.

A round baler, generally designated (2), has a main frame carried by wheels (4), and a pick-up (6) including flexible tines. Cutting means is advantageously provided for chopping the harvested crop and includes a helical rotor (8a) and a plurality of knives (8b). The helical rotor (8a) pulls the harvested crop through the knives and conveys it to a baling chamber (10). FIG. 1 diagrammatically illustrates a pressed bale which fills the baling chamber (10). In a practical example, the baling chamber (10) is defined circumferentially by belts (RA, RB). The belts are entrained around idlers (12, 14) and pre-tensioned by a tensioning device (not shown). Instead of the belts shown in the practical example, the baling chamber can also be defined circumferentially by spirally arranged baling rollers, equally spaced by a belt/baling roller combination.

The baler may include twine tying and/or net wrapping. FIG. 1 shows a roll (16) of continuous web of netting material or film as well as a supply of twine (18). These binding materials (16, 18) are fed individually via a draw-down and conveyor means (20) from the stock in a direction toward an opening in the baling chamber (10). To ensure positive introduction of the binding materials (16, 18) to the baling chamber (10), guiding means (22) is provided in the feed path. This brings the baling materials (16, 18) in contact with the surface of the belt (RB) running around the idler (14). In addition to the feeding effect of the draw-down and conveyor means (20), the belt (RB) and idler (14) cooperate to pull the binding material (16, 18) into the baling chamber (10). The belt (RB) is in immediate contact with the binding material (16, 18), thus allowing that it can be squeezed in and conveyed further between the surface of the belt (RB) and the pressed bale located in the baling chamber (10). An actuating drive (30) acts on an adjustable rod assembly (32) which can be used to tighten or loosen the guiding means (22). This adjustment can be tightened automatically shortly after actuating the draw-down and conveyor means (20), and can be loosened again after the baling process is finished to minimize the wear-causing friction of the guiding means (22). An adjustment during the feed-in process of the binding materials (16, 18) also positive feeds the binding materials (16, 18) into the gap between the guiding means (22) and the belt (RB) which extends over roller (14). The binding materials (16, 18) can be positively pulled in by the roller (14) after tightening the guiding means (22).

Figure 2:
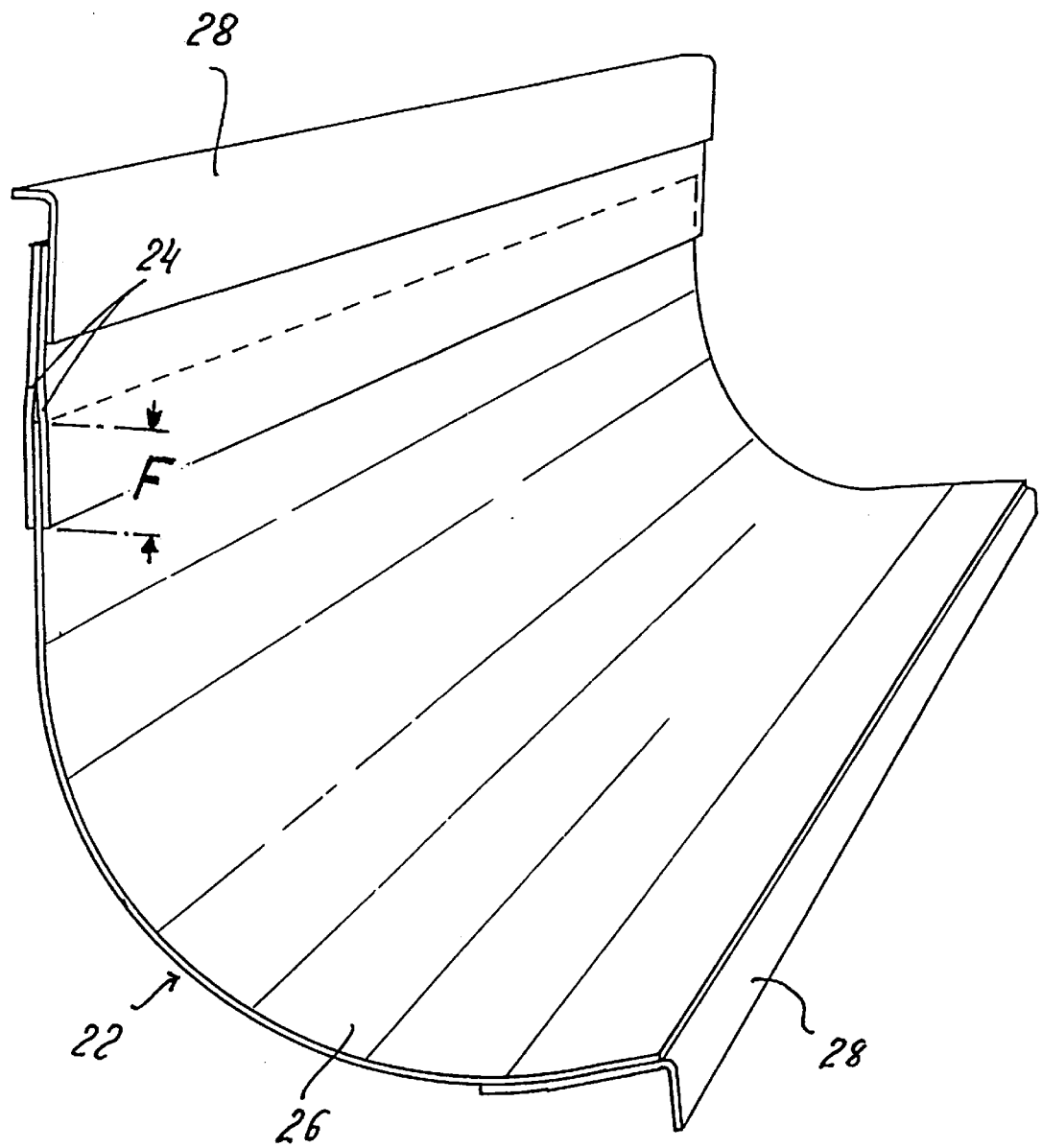
FIG. 2 is an enlarged view of the guiding means.

FIG. 2 shows the guiding means (22) in more detail. The guiding means (22) includes an inelastic but flexible piece of material (26) and a piece of material (24) which has longitudinal elasticity in at least the lengthwise direction of the guiding means (22); i.e. in the curvilinear direction shown in FIG. 2. In the area marked "F" the pieces of material (24) and (26) overlap for assembly or mounting purposes, whereby in the illustrated embodiment the piece of material (24) is double-layered and the piece of material (26) is sandwiched therebetween. Thus in the area "F" the piece of material (26) has, on its front and back side, at least one layer of the piece of material (24). Mounting of the two pieces of material (24) and (26) can be in any known way; for example by mechanical fasteners, such as rivets, by adhesive fasteners, such as glues, etc. At the ends of the guiding means (22), the pieces of material (24, 26) are each mounted to an angular steel member (28), which advantageously serve for mounting in the round baler. Again, such mounting may be in any convenient way as described above.

The piece of material (24) which has a longitudinal elasticity in at least the lengthwise direction of the guiding means, could for example be a flat sheet of natural or synthetic rubber, advantageously vulcanized, or an elastic fabric such as Linatex. The flexible piece of material (26) may be woven of special tearproof and wear-resistant synthetic fibers, such as a plain-weave 2-ply fabric. Preferably the surface of the flexible piece of material (26) has a lower coefficient of friction than the piece of material (24). This is accomplished by the provision of a glide improving coating, for example Teflon, a registered trademark for polytetrafluorethylene. Preferably the flexible piece of material (26) having the lower friction coefficient will be installed in the loop area of the rolls, such as at idler (14); because especially here high-wear occurs and also, to ensure a positive infeed, the binding material should not be decelerated unnecessarily. The piece of material (24) which has a longitudinal elasticity in at least the lengthwise direction of the guiding means (22) is preferably positioned away from the idler (14) or press roll where the wear rate and the effects of deceleration on the binding material are lower.

The described combination of at least two of these pieces of material (24, 26) allows the manufacture of the guiding device (22) so that the flexible piece of material (26) can react flexibly to surface differences (e.g. form) of the idler (14) or press roll, while the connected elastic piece of material (24) can react elastically to surface differences (e.g. eccentricities) of the idler (14) or press roll. With this arrangement the guiding device (22) can lie closely adjacent the surface of the belts surrounding the idler (14) or the press roll, and correspondingly press the binding material(s) (16, 18) tightly against the moving surfaces. This leads to a positive gripping and conveyance of the binding material into the baling chamber (10) and around the bales.

Other objects, advantages and features of the present invention may be perceived by those skilled in the art or from the appended claims.

I claim:

1. In a baler having a baling chamber, means for delivering harvested crop to the baling chamber, means for holding a supply of baling material, feed means for feeding the baling material toward the baling chamber, and guiding means for guiding the baling material fed from the feed means in a lengthwise direction toward the baling chamber; the improvement comprising that the guiding means comprises at least one piece of material which has elasticity in at least the lengthwise direction, and at least one additional form-flexible piece of material attached to said one piece of material.

2. A baler according to claim 1, wherein the surface of the form-flexible piece of material has a lower coefficient of friction than said one piece of material.

3. A baler according to claim 1 wherein the form-flexible piece of material is made from a tear-resistant and wear-resistant synthetic fiber fabric.

4. A baler according to claim 3, wherein the form-flexible piece of material is generally inelastic.

5. A baler according to claim 3, including a polytetrafluorethylene coating on the form-flexible piece of material or its fabric fiber to lower its coefficient of friction.

6. A baler according to claim 1, wherein the elastic piece of material is formed from rubber.

7. A baler according to claim 1, wherein the elastic piece of material is formed from an elastic fabric.

8. A baler according to claim 1, wherein the pieces of material overlap and are joined to each other.

9. A baler according to claim 1, wherein the guiding means has opposite ends and includes an angular steel member at each of the ends to which the attached pieces of material are mounted.

10. A baler according to claim 1, wherein the means for feeding the baling material toward the baling chamber includes a roller, and the form-flexible piece of material is installed adjacent the circumference of the roller.

11. A baler according to claim 1, including an actuating drive for adjusting the guiding means.

12. A baler according to claim 1, wherein the elastic piece of material operates to tension the guiding means only temporarily.

13. A round baler including:
a hinged baling chamber;
means for delivering harvested crop to the baling chamber;
means for holding a supply of baling material;
feed means for feeding the baling material from the supply toward the baling chamber;
guiding means for guiding the baling material fed from the feed means in a lengthwise direction toward the baling chamber and including:
a guide roll,
at least one piece of material spaced from the guide roll and which is elastic in the lengthwise direction; and
at least one additional, generally inelastic, form-flexible piece of material attached to said one piece of material and partly surrounding the guide roll, and having a lower coefficient of friction than said guide roll and said one piece of elastic material.

* * * * *